United States Patent [19]

Zeidler

[11] Patent Number: 4,898,407
[45] Date of Patent: Feb. 6, 1990

[54] COUPLING FOR PIPES WITH PLAIN ENDS

[75] Inventor: Siegmund Zeidler, Hanau, Fed. Rep. of Germany

[73] Assignee: Rassmussen GmbH, Maintal, Fed. Rep. of Germany

[21] Appl. No.: 263,434

[22] Filed: Oct. 27, 1988

[30] Foreign Application Priority Data

Nov. 6, 1987 [DE] Fed. Rep. of Germany ....... 3737669

[51] Int. Cl.$^4$ .............................................. F16L 25/00
[52] U.S. Cl. ...................................... 285/328; 285/373
[58] Field of Search ............... 285/373, 112, 328, 419, 285/252, 253; 24/284, 20 EE

[56] References Cited

U.S. PATENT DOCUMENTS

| 2,005,056 | 6/1935 | Stephens | 285/104 X |
|---|---|---|---|
| 2,473,102 | 6/1949 | Krooss | 285/112 |
| 2,567,062 | 9/1951 | Edelen | 285/328 X |
| 4,119,333 | 10/1978 | Straub | 285/373 X |
| 4,616,858 | 10/1986 | Sauer | 285/373 X |
| 4,627,645 | 12/1986 | Sauer | 285/373 X |
| 4,664,422 | 5/1987 | Straub | 285/373 X |
| 4,726,611 | 2/1988 | Sauer | 285/373 X |
| 4,729,582 | 3/1988 | Zeizler | 285/373 |

FOREIGN PATENT DOCUMENTS 2555179 12/1975 Fed. Rep. of Germany .
427427 12/1966 Switzerland ..................... 24/20 EE Primary Examiner—Dave W. Arola
Attorney, Agent, or Firm—Peter K. Kontler

[57] ABSTRACT

A pipe coupling wherein a one-piece or composite tubular housing has at least one axially parallel slot and its end portions confine annuli of teeth which must penetrate into the ends of the respective pipes to hold the pipes against axial movement relative to each other. In order to ensure that all teeth of each annulus of teeth will penetrate into the peripheral surfaces of the respective pipes when the width of the slot or slots in the housing is reduced, at least those teeth which are adjacent the slot or slots have longer flanks which are nearer to and shorter flanks which are more distant from the respective slot or slots. This reduces the likelihood that teeth which are adjacent the slot or slots would plush the material of the pipes toward the coresponding slot or slots during a narrowing of the slot or slots for the purpose of applying the coupling around the ends of pipes.

13 Claims, 3 Drawing Sheets

PRIOR ART

COUPLING FOR PIPES WITH PLAIN ENDS

BACKGROUND OF THE INVENTION

The invention relates to pipe couplings in general, and more particularly to improvements in couplings which can be used to separably connect to each other pipes with plain ends. Still more particularly, the invention relates to improvements in pipe couplings of the type wherein an arcuate housing is provided with one or more axially parallel slots and can be placed around the ends of the pipes which are to be coupled to each other preparatory to a reduction of the width of the slot or slots to thus urge annuli of teeth in the interior of the housing against and into the material of the ends of the pipes.

Couplings of the above outlined character are disclosed in commonly owned German Auslegeschrift No. 25 55 179 of Zeidler, in commonly owned copending patent application Ser. No. 079,659 filed July 29, 1987 by Zeidler for "Pipe coupling", and in commonly owned copending patent application Ser. No. 173,250 filed Mar. 24, 1988 by Zeidler et al. for "Pipe coupling". Similar pipe couplings are disclosed in commonly owned U.S. Pat. No. 4,729,582 granted Mar. 8, 1988 to Zeidler for "Pipe coupling".

Commonly owned U.S. Pat. Nos. 4,616,858 (granted Oct. 14, 1986 to Sauer for "Flexible pipe coupling"), 4,627,645 (granted Dec. 9, 1986 to Sauer for "Flexible pipe coupling) and 4,726,611 (granted Feb. 23, 1988 to Sauer for "Flexible pipe coupling) disclose toothless pipe couplings wherein the housing can urge the lips of an elastic sleeve-like insert against the ends of the pipes which are to be sealingly coupled to each other.

The teeth of pipe couplings which are disclosed in the Auslegeschrift and in copending patent applications of Zeidler and Zeidler et al. have flanks of identical size, and the flanks of each tooth make an angle which does not exceed 90 degrees. Such teeth (each of which consists of two mirror symmetrical halves) are considered desirable and advantageous because they are expected to readily penetrate into the material of the pipe ends to thereby hold the pipes against axial and/or other movement relative to each other. It has been found that pipe couplings which are provided with such teeth are not entirely satisfactory because the teeth which are adjacent the slot or slots of the housing are likely to shift the material of the respective pipe ends in the circumferential direction of the pipes when the width of the slot or slots is being reduced whereby the accumulations of the material of pipes at those flanks of teeth which are nearer to the adjacent slot or slots offer a pronounced resistance to further reduction of the width of the slot or slots so that the teeth which are remote from the slot or slots fail to penetrate into the material of the pipe ends or the tips of such remote teeth penetrate only negligibly so that their retaining action is unsatisfactory. The reason for such drawbacks of known pipe couplings is that the teeth which are nearest to the slot or slots of the housing are caused to move radially inwardly into the respective pipe ends as well as circumferentially of the pipes whereby their tips push the material of the pipes toward the adjacent slot or slots.

OBJECTS OF THE INVENTION

An object of the invention is to provide a novel or improved pipe coupling wherein the teeth are configurated and distributed in such a way that all of them are more likely to penetrate into the adjacent pipe ends than in heretofore known pipe couplings.

Another object of the invention is to provide a pipe coupling which can hold the pipe ends against axial and/or other movement with a force greatly exceeding that which can be applied by a conventional pipe coupling.

A further object of the invention is to provide novel and improved arrays of teeth for use in pipe couplings, especially in couplings for pipes with plain ends.

An additional object of the invention is to provide a pipe coupling wherein the teeth which are adjacent the slot or slots in the housing of the pipe do not prevent the more distant teeth from penetrating into the pipes in response to a narrowing of the slot or slots in the housing.

Still another object of the invention is to provide a pipe coupling which constitutes an improvement over and a further development of pipe couplings disclosed in the aforementioned copending patent applications of Zeidler and Zeidler et al.

Another object of the invention is to provide a novel and improved method of ensuring uniform engagement of internal teeth of a pipe coupling with the ends of the pipes all around the circumferences of the pipes.

An additional object of the invention is to provide a novel and improved pipe coupling which can employ numerous component parts of heretofore known pipe couplings.

SUMMARY OF THE INVENTION

The invention is embodied in a pipe coupling, particularly in a coupling for pipes with plain ends. The improved coupling comprises a tubular housing which can be placed around the ends of the pipes to be coupled to each other, at least one substantially axially extending slot in the housing, and at least two annuli of teeth which are provided in the interior of the housing so that each annulus surrounds the end of one of the pipes which are to be coupled to each other. Each annulus of teeth includes a pair of portions which flank the at least one slot, and each tooth of at least one portion of each annulus has a longer flank nearer to and a shorter flank more distant from the at least one slot. The coupling further comprises means (e.g., nuts and bolts) for varying the width of the at least one slot so as to cause the teeth to penetrate into the ends of the respective pipes in response to a reduction of the width of the at least one slot.

If the housing has n slots (n being a whole number including one), each annulus of teeth has a pair of portions flanking each of the n slots. At least one portion of each pair has teeth each having a longer flank nearer to and a shorter flank more distant from the respective slot. The varying means can include means for individually varying the width of each of the n slots. The housing can be provided with an even number (e.g., two or four) or with an uneven number (e.g., one or three) of slots.

At least one annulus of teeth can further comprise at least one additional portion which is disposed intermediate the respective pair of portions and includes teeth with pairs of identical flanks.

The housing is preferably deformable, at least if it has a single slot.

The coupling can comprise at least two annuli of teeth for each of the pipes which are to be coupled to each other.

The length of one portion of each pair of portions (as measured in the circumferential direction of the housing) preferably equals or approximates the length of the other portion of the respective pair of portions.

Each annulus of teeth can extend along an arc which equals or is only slightly less than 360 degrees.

The coupling can further comprise means for securing the annuli of teeth to the housing, and the housing can comprise means for holding the annuli of teeth against movement in the axial direction of the housing.

In accordance with a presently preferred embodiment of the invention, each portion of each pair of such portions has teeth with longer and shorter flanks which are respectively nearer to and more distant from the nearest slot.

The teeth of the annuli preferably have sawtooth shaped profiles.

The invention can be defined in a somewhat different way as follows: The housing has n slots (n being a whole number including one), nd each annulus of teeth (preferably sawtooth shaped teeth) includes n arcuate sections each having two ends. Each such end is adjacent a slot, and each section includes two halves each having a length equal to m/n wherein m is half the circumferential length of the housing. Each of the halves includes one of the respective pair of portions.

The novel features which are considered as characteristic of the invention are set forth in particular in the appended claims. The improved coupling itself, however, both as to its construction and the mode of applying and disengaging the same, together with additional features and advantages thereof, will be best understood upon perusal of the following detailed description of certain specific embodiments with reference to the accompanying drawing.

DESCRIPTION OF PREFERRED EMBODIMENTS

Figure 1:
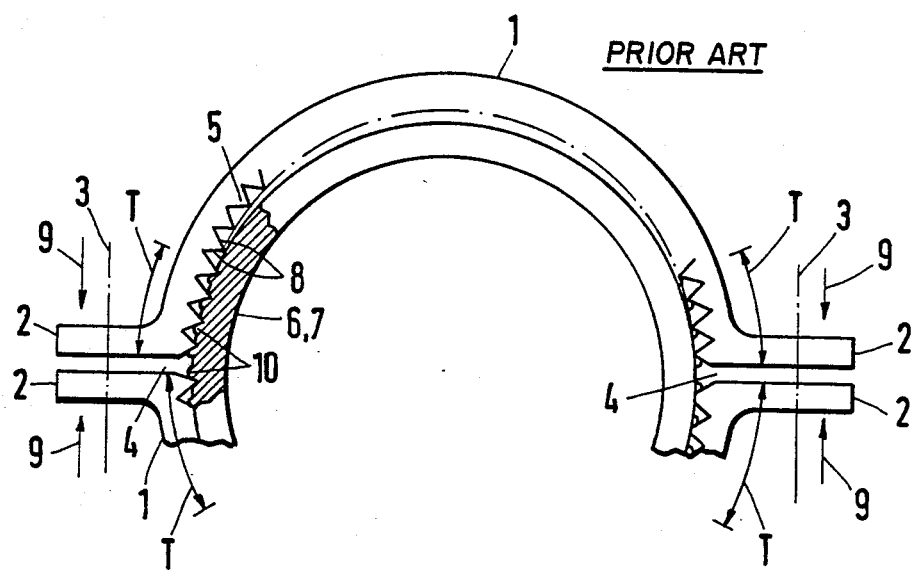
FIG. 1 is a fragmentary partly end elevational and partly transverse sectional view of a conventional pipe coupling.

FIG. 1 shows a portion of a known pipe coupling wherein the tubular housing comprises two arcuate sections or shells 1 each extending along an arc of approximately 180 degrees. Such sections can be placed around the ends of two pipes 6, 7 which are to be coupled to each other, and their end portions are provided with radially outwardly extending flanges 2 defining slots or gaps 4 and being movable toward each other by suitable fasteners 3 (e.g., bolts and nuts) so as to reduce the width of the respective slots 4 and hence the internal diameter of the housing with attendant penetration of annuli of teeth 5 into the material of the end portions of the respective pipes 6 and 7. The housing including the shells 1 is provided with at least one annulus of teeth 5 for each of the pipes 6 and 7. Each tooth 5 has two identical flanks 8 which make an angle of 90 degrees or an acute angle at the tip of the respective tooth. The directions in which the flanges 2 of sections 1 of the tubular housing must be moved toward each other in response to application and tightening of the fasteners 3 (extending through holes in the flanges 2) are indicated by arrows 9.

When an operator or a robot is in the process of applying the fasteners 3 in a direction to reduce the width of the slots 4, the fasteners 3 reduce the diameter of the composite housing including the shells 1 and, at the same time, the fasteners 3 cause those teeth 5 which are adjacent the slots 4 to move in the directions of arrows 9 whereby the tips of the teeth 5 not only penetrate into the material of the respective pipes but such tips also push the material of the pipes in the directions of the respective arrows 9 so that the thus displaced material piles up in front of those flanks 8 which are nearer to the respective slots 4. The pileups of the material of pipes 6 and 7 are shown at 10. Such pileups are observable in the regions of those portions T of the annuli of teeth 5 which flank the slots 4. The resistance which the pileups 10 of the material of pipes 6, 7 offer to a reduction of the width of slots 4 can be so pronounced that the teeth 5 which are remote from the slots 4 (such as the teeth 5 between the two upper portions T of the annulus of teeth which is fully shown in FIG. 1) might not be able to come in contact with the peripheral surfaces of the respective pipes so that the applied coupling might not be capable of offering an expected resistance to movement of the ends of pipes 6 and 7 away from each other. This can result in actual separation of the pipes or in leakage of fluids from the pipes into the surrounding atmosphere or vice versa. The damming or pileup of the material of pipes as a result of movement of teeth 5 in the portions T of the annuli of teeth toward the slots 4 is sufficiently pronounced to be readily detectable, the same as the absence of any (or the absence of adequate) penetration of those teeth 5 which are distant from the slots 4.

Figure 2:
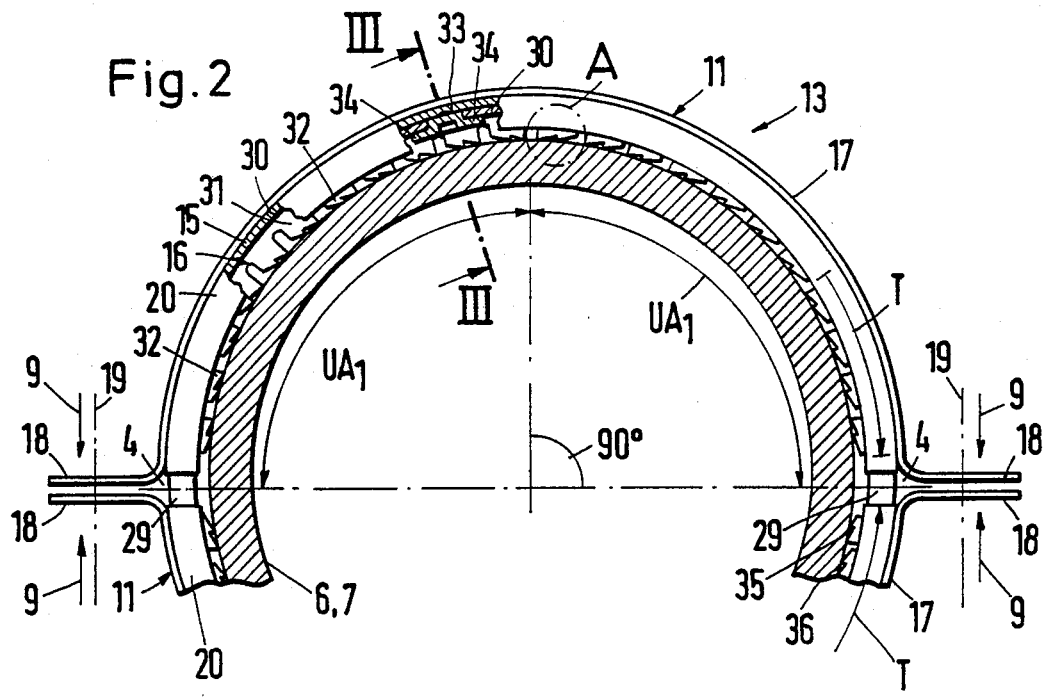
FIG. 2 is a fragmentary partly end elevational and partly transverse sectional view of a pipe coupling which embodies one form of the invention.
Figure 3:
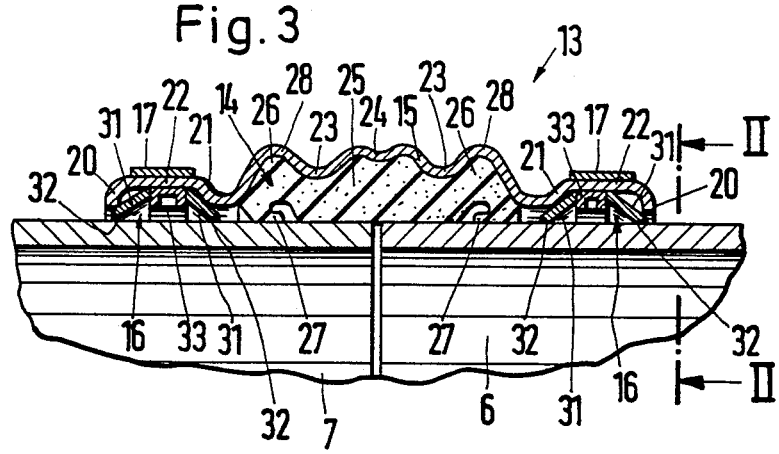
FIG. 3 is an enlarged sectional view as seen in the direction of arrows from the line III—III of FIG. 2.

FIGS. 2 and 3 show a portion of a pipe coupling which embodies one form of the invention and includes a tubular housing 13 having two arcuate sections or shells 11 each extending along an arc of approximately 180 degrees. The shells 11 are made of a metallic material and surround a sleeve-like elastic sealing element 14 which surrounds the plain ends of two metallic pipes 6 and 7. The end portions of the shells 11 are provided with radially outwardly extending flanges 18 defining slots 4 and having openings (not specifically shown) for fasteners 19 which are indicated by phantom lines. Such fasteners are designed to vary the width of the corresponding slots 4 by moving the respective flanges 18 nearer to each other to thereby deform the sealing element 14 or by permitting the corresponding flanges 18 to move away from each other when the sealing element 14 is permitted to dissipate energy. For example, the fasteners 19 can include several sets of bolts and nuts for each pair of flanges 18.

Each shell 11 comprises a body 15 of metallic sheet material which is provided with corrugations extending in the circumferential direction of the housing 13. The end portions of the shells 11 surround semicircular halves of two retaining devices 16 each of which has two annuli of teeth 32 (see particularly FIG. 4) which must penetrate into the respective pipes 6, 7 to thereby hold the pipes against axial and/or other undesirable movement relative to each other. The aforementioned flanges 18 constitute outwardly bent end portions of two tensioning bands or straps 17 which are welded to the external surfaces of the end portions of shells 11.

The end portions of each shell 11 are bent radially inwardly to constitute end walls 20 forming part of the means for holding the retaining devices 16 against movement in the axial direction of the housing 13. Such holding means further include radially inwardly extending corrugations 21 of the sheet metal bodies 15. The corrugations 21 are spaced apart from the respective end walls 20 in the axial direction of the housing 13. The end walls 20 of the shells 11 and the respective corrugations 21 define two ring-shaped chambers 22 for the corresponding retaining devices 16. Each of the chambers 22 has a substantially trapeziform cross-sectional outline and its width increases in a direction radially inwardly, i.e., toward the axis of the assembled tubular housing 13.

Two additional radially inwardly extending corrugations 23 of each of the shells 11 are disposed between the respective pairs of corrugations 21 and serve to deform the adjacent portions of the sleeve-like sealing element 14. The corrugations 23 and the adjacent radially inwardly depressed portions of the sealing element 14 flank the gap (if any) between the end faces of the pipes 6 and 7. The peripheral surface of the sealing element 14 in undeformed condition of this element is normally a cylindrical surface which is deformed by the corrugations 23 as well as by an additional corrugation 24 which is disposed midway between the corrugations 23 so as to deform the adjacent portion 25 of the sealing element 14. The end portions 26 of the sealing element 14 are provided with internal sealing lips 27 which are in direct contact with the peripheral surfaces of the respective pipes in assembled condition of the coupling. The lips 27 are disposed radially inwardly of two radially outwardly extending corrugations 28 of each shell 11.

FIG. 2 shows two undulate or corrugated inserts 29 which extend across the slots 4 between the neighboring portions of the shells 11 and whose corrugations are complementary to those of the sheet metal bodies 15. The inserts 29 overlie the elastic sealing element 14 between the shells 11.

Figure 4:
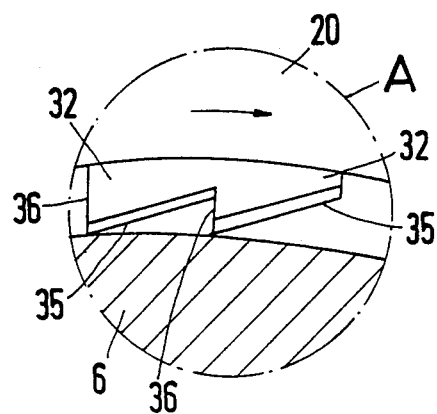
FIG. 4 is an enlarged view of a detail within the phantom-line circle A in FIG. 2.

Each retaining device 16 comprises a substantially roof-shaped member 30 with two mutually inclined sidewalls 31 extending in the circumferential direction of the housing 13 and having radially innermost portions provided with annuli of teeth 32 of the type shown on a larger scale in FIG. 4. Each roof-shaped member 30 is received in the respective chamber 22 of the housing 13 and its central portion has one or more openings for the protuberances 33 of connectors which are welded to the respective end portions of the shells 11 and have lugs or skirts 34 which are overlapped by the internal surfaces of the respective chambers 22 so as to prevent extraction of the protuberances 33 from the respective members 30. The inclination of the sidewalls 31 with reference to the axis of the housing 13 is less pronounced than the inclination of the end walls 20 and of those portions of corrugations 21 which cooperate with the end walls 20 to form the chambers 22. In other words, the sidewalls 31 are inclined with reference to the end walls 20 and with respect to the adjacent portions of respective corrugations 21.

Each of the sidewalls 31 carries one-half of a complete annulus of teeth 32, and all of the teeth 32 are configurated in a manner as shown in FIG. 4, namely, each such tooth has a longer flank 35 and a shorter flank 36. The teeth 32 in the left-hand half $UA_1$ of the upper roof-shaped member 30 of FIG. 2 are oriented in such a way that the longer flanks 35 are nearer to the left-hand slot 4 and the teeth 32 in the right-hand half $UA_1$ of the upper member 30 of FIG. 2 are oriented in such a way that their longer flanks 35 are nearer to the right-hand slot 4. The teeth 32 have sawtooth profiles. The orientation of teeth 32 on the sidewalls 31 of the lower member 30 of FIG. 2 is the same as described above in connection with the upper member 30. Each of the members 30 extends along an arc of nearly 180 degrees, i.e., the same as the respective shell 11.

When a member 30 is properly inserted into the respective chamber 22, its radially outermost portion is closely adjacent the radially outermost portion of the chamber and the teeth 32 of its sidewalls 31 project radially inwardly beyond the respective end wall 20 and the respective corrugation 21. Instead of being welded (particularly spot welded) to the chambers 22, the protuberances 33 can be otherwise bonded to the respective chambers 22. All that counts is to ensure that the retaining devices 16 remain in the respective chambers 22 during storage and transport as well as during application of the improved coupling to the ends of two pipes.

An important advantage of the aforedescribed configuration and orientation of teeth 32 is that the teeth which are disposed next to the slots 4 (those portions of the annuli of teeth 32 which include the teeth nearest to the slots 4 are denoted by the characters T) are less likely or highly unlikely to pile up the material of pipes 6 and 7 in front of them during narrowing of the slots 4 by the fasteners 19. This will be readily appreciated by looking at FIG. 2 which shows that the longer flanks 35 of the teeth 32 in the portions T of the annuli of teeth can more readily slide along the peripheral surfaces of the respective pipes than teeth of the type shown at 5 in FIG. 1. Thus, the teeth 32 in the portions T move primarily in the circumferential direction of the pipes 6 and 7, at least during the initial stages of narrowing of the slots 4, prior to starting to move radially inwardly of and to thus penetrate into the respective pipes. This ensures that all of the teeth 32 can contribute to retention of the pipes 6 and 7 in the positions which are shown in FIG. 3, i.e., the pipes are more reliably held against axial and/or other movement relative to each other because they are engaged by annuli of teeth 32 which form complete or practically complete circles all the way around the ends of the pipes. It can be said that a movement of the flanges 18 in directions which are indicated by the arrows 9 first entails a movement of teeth 32 in the portions T in the directions of such arrows and a simultaneous movement radially inwardly toward the axes of the respective pipes but without any damming or pileup of the material of pipes in front of the longer flanks 35 of the teeth which are immediately or closely adjacent the slots 4.

Figure 5:
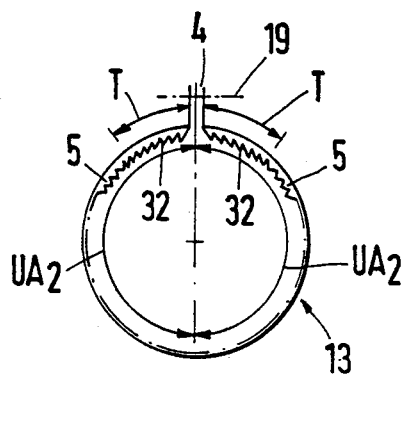
FIG. 5 is a diagrammatic end elevational view of a pipe coupling which embodies a second form of the invention.

FIG. 2 shows that each of the teeth 32 on each of the sidewalls 31 is formed with a longer flank 35 and a shorter flank 36. However, it is equally within the purview of the invention to construct the sidewalls 31 of the roof-shaped members 30 in each of the retaining devices 16 in such a way that portions T with teeth 32 of the type shown in FIG. 4 flank portions with teeth 5 of the type shown in FIG. 1. This is shown in FIG. 5 which further shows that the housing 13 has a single slot 4 flanked by two portions T with teeth 32. Thus, each of the two halves $UA_2$ of each annulus of teeth includes two portions T with teeth 32 which are adjacent the slot 4 and a median portion with teeth 5.

The coupling of FIG. 5 can be modified by providing it with annuli of teeth each having a configuration as shown in FIG. 4. The longer flanks 35 of teeth 32 in the left-hand half $UA_2$ of each annulus of teeth are then inclined in a manner as shown for the teeth 32 of the left-hand portion T, and the teeth 32 in the right hand half $UA_2$ of each annulus of teeth are then inclined in a manner as shown in the right-hand portion T of FIG. 5.

Figure 6:
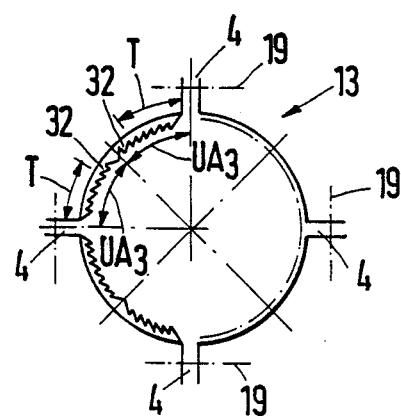
FIG. 6 is a diagrammatic end elevational view of a pipe coupling which embodies a third form of the invention.

The number of slots 4 in the coupling of FIGS. 2 to 4 or in the coupling of FIG. 5 can be increased to three (the housing 13 then includes three shells 11) without departing from the spirit of the invention. FIG. 6 shows by way of example a housing 13 with four shells each of which extends along an arc of approximately 90 degrees. This housing has four slots 4 and, therefore, each annulus of teeth in such housing has four arcuate sections each extending along an arc of approximately 90 degrees. Each such section includes two portions T which are adjacent its ends, i.e., they are adjacent the respective slots 4, and each portion T has teeth 32 which are oriented in such a way that their longer flanks are nearer to and their shorter flanks are more distant from the nearest slots 4. In this embodiment, each portion T extend along an arc $UA_3$ of approximately 45 degrees, i.e., it takes up one-half of the respective arcuate section of the corresponding annulus of teeth.

The length of sections $UA_1$, $UA_2$ and $UA_3$ can be said to correspond to m/n wherein m equals one-half of the circumferential length of the housing 13 and n is the number of slots 4.

It often suffices if only one portion T of each pair of portions of teeth which are adjacent a slot 4 is provided with teeth 32 having an orientation and configuration as shown in FIGS. 2 and 4.

An important advantage of the improved coupling is that all of the teeth can penetrate into, and hence properly engage, the respective pipes in response to narrowing of the slot or slots in the housing 13 as well as that such narrowing of the slot or slots necessitates the exertion of a lesser force than if all of the teeth were shaped and oriented in a manner as shown in FIG. 1.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A pipe coupling, particularly for pipes with plain ends, comprising a tubular housing arranged to be placed around the ends of pipes which are to be coupled to each other, said housing having at least one substantially axially extending slot; at least two annuli of teeth carried by and provided in the interior of said housing so that each of said annuli surrounds the end of one of the pipes which are to be coupled to each other, each of said annuli including a pair of portions which flank said at least one slot and each tooth of at least one portion of each of said annuli having a longer flank nearer to and a shorter flank more distant from said at least one slot and so constructed and arranged that when said teeth penetrate into the ends of the pipes, material build up of the pipe ends in front of the teeth is substantially eliminated; and means for varying the width of said at least one slot so as to cause said teeth to penetrate into the ends of the respective pipes in response to a reduction of the width of said at least one slot.

2. The coupling of claim 1, wherein said housing has n slots and each of said annuli has a pair of portions flanking each of said slots, at least one portion of each of said pairs having a longer flank nearer to and a shorter flank more distant from the respective slot.

3. The coupling of claim 2, wherein said varying means includes means for individually varying the width of at least two slots.

4. The coupling of claim 2, wherein said housing has an even number of slots.

5. The coupling of claim 1, wherein at least one of said annuli further comprises at least one additional portion disposed intermediate the respective pair of portions and including teeth with pairs of identical flanks.

6. The coupling of claim 1, wherein said housing is deformable and has a single slot.

7. The coupling of claim 1, comprising two annuli of teeth for each of the pipes which are to be coupled to each other.

8. The coupling of claim 1, wherein the length of one portion of each pair of portions in the circumferential direction of said housing at least approximates the length of the other portion of the respective pair.

9. The coupling of claim 1, wherein each of said annuli extends along an arc of approximately 360 degrees.

10. The coupling of claim 1, further comprising means for securing said annuli of teeth to said housing.

11. The coupling of claim 1, wherein said housing has means for holding said annuli against movement in the axial direction of the housing.

12. The coupling of claim 1, wherein each of said pairs of portions has teeth with longer and shorter flanks which are respectively nearer to and more distant from said at least one slot.

13. The coupling of claim 1, wherein said teeth have sawtooth shaped profiles, said housing having n slots and each of said annuli including n arcuate sections each having two ends, each of said ends being adjacent a slot, each section including two halves and each of said halves having a length equal to m/n wherein m is half the circumferential length of said housing, each of said halves including one of the respective pair of said portions.

* * * * *